United States Patent
Fourcade et al.

(10) Patent No.: US 9,195,411 B2
(45) Date of Patent: Nov. 24, 2015

(54) SD CARD MEMORY TOOL

(71) Applicant: Nintendo of America Inc., Redmond, WA (US)

(72) Inventors: Sayaka Sogabe Fourcade, Seattle, WA (US); Michael Carl Leslie, Renton, WA (US); Randy Lee Shoemake, Monroe, WA (US); Brian Robert Silvola, Bellevue, WA (US); Alexander Abram Youells, Seattle, WA (US)

(73) Assignee: NINTENDO OF AMERICA INC., Redmond, WA (US)

( * ) Notice: Subject to any disclaimer, the term of this patent is extended or adjusted under 35 U.S.C. 154(b) by 0 days.

(21) Appl. No.: 13/929,842

(22) Filed: Jun. 28, 2013

(65) Prior Publication Data

US 2013/0290633 A1 Oct. 31, 2013

Related U.S. Application Data

(63) Continuation of application No. 12/764,325, filed on Apr. 21, 2010, now Pat. No. 8,479,054.

(51) Int. Cl.
| | |
|---|---|
| *G06F 11/00* | (2006.01) |
| *G06F 3/06* | (2006.01) |
| *G06F 11/36* | (2006.01) |

(52) U.S. Cl.
CPC ............ *G06F 3/0679* (2013.01); *G06F 3/0619* (2013.01); *G06F 3/0653* (2013.01); *G06F 11/3696* (2013.01)

(58) Field of Classification Search
CPC .......................... G06F 11/1666; G06F 13/385
USPC ........................................ 714/42, 25, 47.1, 48
See application file for complete search history.

(56) References Cited

U.S. PATENT DOCUMENTS

| | | | |
|---|---|---|---|
| 7,134,058 B2 | 11/2006 | Lauga | |
| 7,516,269 B2 * | 4/2009 | Hong | ............................ 711/103 |
| 7,536,291 B1 | 5/2009 | Retnamma et al. | |
| 2003/0051194 A1 | 3/2003 | Cabezas et al. | |
| 2005/0086456 A1 | 4/2005 | Elboim et al. | |
| 2007/0011395 A1 * | 1/2007 | Kim | ............................ 711/103 |
| 2007/0105607 A1 | 5/2007 | Russell et al. | |
| 2009/0083486 A1 | 3/2009 | Chen et al. | |
| 2009/0125928 A1 | 5/2009 | Matsushima et al. | |
| 2009/0144045 A1 | 6/2009 | Kanade | |
| 2009/0271170 A1 | 10/2009 | De Barros et al. | |
| 2009/0313512 A1 | 12/2009 | Jing et al. | |
| 2010/0248823 A1 * | 9/2010 | Smith | ............................ 463/29 |
| 2011/0191499 A1 | 8/2011 | Andersson et al. | |

\* cited by examiner

*Primary Examiner* — Sarai Butler
(74) *Attorney, Agent, or Firm* — Nixon & Vanderhye P.C.

(57) ABSTRACT

A method and apparatus for obtaining the size of a file of save data created by a computer game device. Save operations by the computer game device and a personal computer device are performed on an SD memory card, and the size of the file of save data is determined based on the two save operations.

7 Claims, 6 Drawing Sheets

SD CARD MEMORY TOOL

CROSS-REFERENCE TO RELATED APPLICATION

This application is a continuation of U.S. Ser. No. 12/764,325, filed Apr. 21, 2010, now U.S. Pat. No. 8,479,054, the entire contents of which is hereby incorporated by reference.

TECHNICAL FIELD

The technology herein relates to a method and apparatus for filling an SD memory card in order to test error conditions in software. In more detail, the technology herein relates to techniques for easily obtaining the file size of a file that is saved by a game system on an SD memory card, and creating a file on the SD card that leaves a specified amount of space available on the SD card so that the game can handle these memory conditions properly.

BACKGROUND AND SUMMARY

Computers store information and programs by means that are, in essence, either electronic or mechanical. Electronic methods, generally called memory, are highly valued for their ability to keep pace with the computer's central processing unit, or CPU, which typically shuttles bits of information and program instructions in and out of the memory several million times a second.

However, it is almost an axiom in the world of computers that there is never available a satisfactory amount of memory. Programs and data tend to grow, first to fill and then to exceed whatever memory a computer may command. To handle the overflow, mechanical methods have been introduced. Commonly called storage, these devices, even though at their fastest many times slower than the purely electronic circuits of memory, still offer huge capacities available at a small fraction of memory's cost per word.

One popular type of a storage device of the non-volatile memory card format is the secure digital (SD) card, developed by Panasonic, SanDisk and Toshiba for use in portable devices. Currently it is widely used in handheld computers, PDAs, media players, mobile phones, GPS receivers, digital cameras and camcorders as well as video games. Standard SD cards have capacities up to 2 GB, whereas the capacity range for high capacity SDHC cards begins at 4 GB and reaches as high as 32 GB. SDXC (extended capacity) format allows for up to 2 TB capacity cards.

Storage management systems have evolved into complex entities with many components including hardware and software modules designed to perform a variety of different storage operations on electronic data. One particular example of a storage management system is a game platform, for example, a Nintendo® machine, such as a Wii® or a DS® device, that executes a computer game program. Every time the game platform executes a game computer program, data is created that is saved internally and/or externally on a removable storage device. Such data may include, for example, three dimensional game scenes, records of positions of player characters in the game scenes, records of scores, etc.

In some instances, game developers and product testing department staff may wish to simulate storage operations to a particular storage device. For example, they may want to check abnormal SD card memory conditions in software created by Nintendo, or any other software manufacturer. In other words, they may want to check what is the exact memory condition of the SD card used when the Nintendo device performs a save operation on the SD card.

In particular, the following two memory conditions (and others depending upon the programming guideline requirements for the particular Nintendo device) are usually checked: 1) insufficient memory is available on the SD card to perform the save operation and 2) exactly enough memory is available on the SD card to perform the save operation. These memory conditions may result, for example, in the game not displaying accurate information to the users when insufficient memory or very close to memory needed is available on the SD card medium.

In order to create these conditions on an SD card, a tester may induce the above undesired situation by filling the SD card to the point where the storage device becomes unavailable for further storage. Inducing this behavior may comprise writing data to such storage device until the device becomes full.

In order to create the above memory conditions on an SD card, a lengthy and imprecise process is used in which the user first obtains the size of a file that is saved by the game. Then, the user calculates the amount of space that would be needed to remain on the SD card in order to cause one of the above two conditions to exist. Then, some method of creating, copying, and manipulating files to fill the SD card would occur.

However, this process is prone in several places for human calculation error, and does not generally result in the most accurate form of testing. Additionally, it requires a significant amount of time and effort from the tester to perform all of these operations.

Therefore, it would be beneficial if an automated process allowed a user to simulate abnormal memory conditions in an SD memory card when a Nintendo device creates save data on the SD memory card. Moreover, it would be beneficial if an automated process allowed the user to fill an SD memory card with a file so that predetermined, user-defined, memory space on the card is available.

In one exemplary illustrative non-limiting implementation, an automated method easily obtains the file size of a file that is saved by the SD card. The method removes a human calculation of the file size from the process, and as such, it is inherently more accurate.

In another exemplary illustrative non-limiting implementation, the method implements an automated process for properly filling the SD card to create a memory condition in which the SD card has insufficient memory to perform a save operation on a Nintendo device. The user is only required to press a button and enter a value that represents the size of the file that is saved by the Nintendo device.

In yet another exemplary illustrative non-limiting implementation, the method implements an automated process for properly filling the SD card to create a memory condition in which the SD card has exactly enough space to perform a save operation. Additionally, the method allows the creation of a file of a size determined by the user. This allows for the application to meet future needs that were not present at the time the application was created.

Non-limiting exemplary illustrative features and advantages for exemplary implementations include:

The application integrates a process in which the storage medium is filled to a particular point in order to test an error condition in software.
  The process involves checking situations in which insufficient memory is available to store a file, exactly enough memory is available to store a file, and sufficient memory is available to store a file. Depending upon the memory condition that is created, the software that is being tested is expected to behave in a particular manner.
  The application fills a storage medium with dummy data with the intent of testing insufficient or abnormal memory conditions when a device tries to store data to the storage medium.

This type of application would be beneficial in product testing within several industries, for testing the software behavior when abnormal memory conditions exist on a medium.

The method allows users to completely fill a storage medium's memory so that no available memory exists.

The method allows users to completely or partially fill a storage medium's memory by writing a user-defined file size.

The process to identify file size of a file written to an external device includes:
  Automatically detect available removable device
  Check available free memory
  Physically remove SD card and insert in other device
  Perform save
  Reinsert SD card into PC
  Application calculates difference in available memory and displays results to user

BRIEF DESCRIPTION OF THE DRAWINGS

These and other features and advantages will be better and more completely understood by referring to the following detailed description of exemplary non-limiting illustrative embodiments in conjunction with the drawings of which.

DETAILED DESCRIPTION

Techniques described herein can be performed on any type of computer system including a personal computer, a home video game machine, a portable video game machine, a networked server or any other type of device or arrangement having computation and graphical display capabilities which stores data to an SD card. One exemplary illustrative non-limiting implementation includes a home video game system such as the Nintendo Wii 3D video game system, a Nintendo DS or other 3D capable interactive computer graphics display systems. One exemplary illustrative non-limiting implementation is described below, but other implementations are possible.

Figure 1:
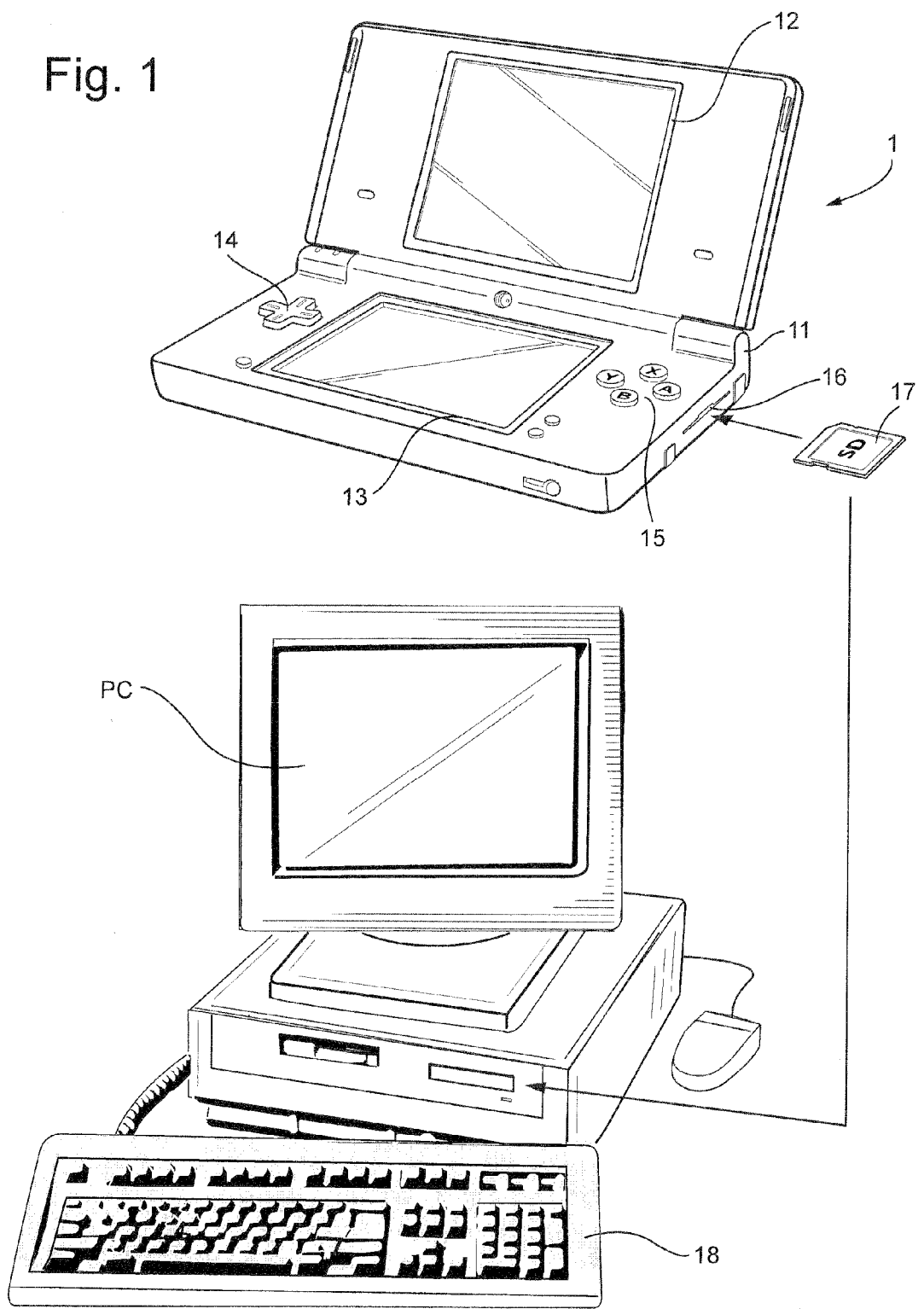
FIG. 1 schematically shows a configuration supporting a non-limiting exemplary embodiment of the SD card memory tool according to the invention.

In a non-limiting exemplary embodiment, a portable game device 1 which executes a game program is shown in FIG. 1. The game device is accommodated in a housing 11, so that two liquid crystal display devices 12 and 13 are placed in predetermined positions. In addition, the game device comprises various operational switches 14 and 15. An SD memory card 17 may be used to save a file that is created by the game being executed by the game device 1. The SD memory card 17 is inserted into slot 16 of the housing 11 when game data is needed to be saved in a portable non-volatile memory card. In addition, FIG. 1 shows a PC 18. This computer device supports the method disclosed herein. The SD card 17 is also inserted into the PC 18 for reasons explained below.

Figure 2:
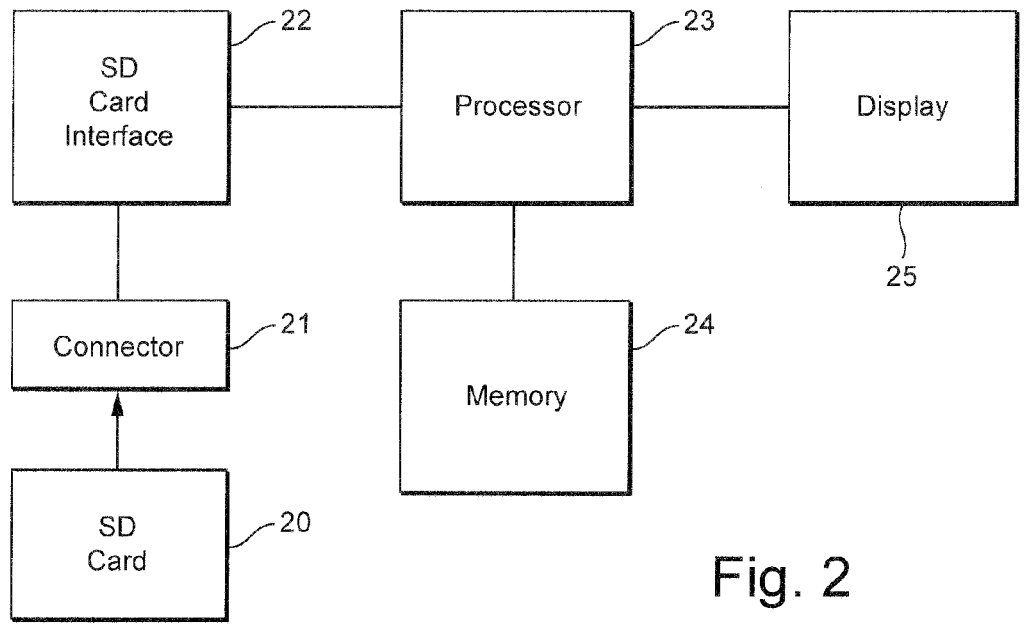
FIG. 2 schematically shows an internal structure of the interface between the SD memory card and a game device according to a non-limiting exemplary embodiment.

FIG. 2 shows an internal structure of the interface between the SD memory card 20 and the game device 1. The SD card 20 is detachably connected to a connector 21 within the housing of the game device 1. Via a predetermined bus and an SD card interface 22, the connector 21 is connected to a processor 23. The processor 23 is connected to a memory unit 24 and to a display unit 25. Data which is obtained by the processor 23 executing the game program and data from which to generate images are stored in the memory, e.g., a working RAM (WRAM) 24.

The SD memory card of the exemplary embodiment presented herein may have standard SD card capacities, high SD card capacities, or extended SD card capacities. Data that is created by the execution of the game program can be transferred and saved in the removable SD card 20.

In one exemplary embodiment of the invention, the application automates the process of verifying the correct handling of abnormal SD card conditions in software created for Nintendo devices. This is accomplished by first obtaining the size of the file saved by the Nintendo device on the SD card, followed by intentionally filling the SD card with data so that a predetermined available memory space exists on the card.

Figure 3:
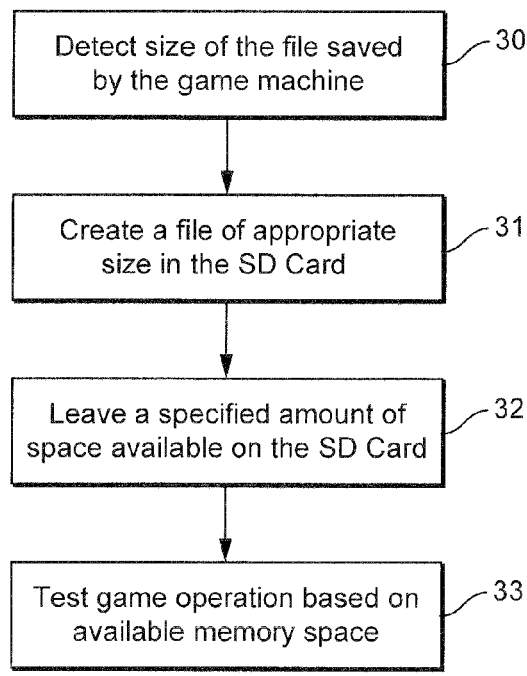
FIG. 3 shows an exemplary illustrative non-limiting software flowchart.

FIG. 3 shows a flowchart of the above process. First, in step 30, the application checks the size of the Save Data created by the Nintendo device (described later). This information is then displayed to the user. Next, the application allows the user to completely or partially fill the SD card's memory by writing a user-defined sized file (step 31). This creates a user-specified available memory space in the SD card (step 32). These user-specified memory space conditions include a completely filled SD card (0 bytes/blocks remaining); and a partially filled SD card (user-defined amount of bytes/blocks remaining). Finally, in step 33, the tester can test whether the game displays accurate information to users based on available memory space on the SD card medium.

The application is designed to test guidelines for Nintendo devices, such as the device 1 of FIG. 1, which access an SD card. Users are provided with automated methods to perform the following actions: a) Check File Size (check the size of the Save Data created by the Nintendo device); b) Fill SD Card Completely (completely fill the SD card so that there are 0 bytes/blocks remaining); c) Create File of user Defined Size (create a file on the SD card of a custom size specified by the user); d) Create File of Exact Size (create a file on the SD card that is appropriately sized to leave exactly enough space for the Nintendo device to complete a save operation); e) Create File of Insufficient Size (create file on the SD card that is appropriately sized to leave exactly not enough space so that the Nintendo device cannot complete a save operation); and f) Benchmark SD Card (benchmark the transfer rate performance of an SD card to identify SD cards that perform write operations at a slow rate). These options available to the user are explained below.

Figure 4:
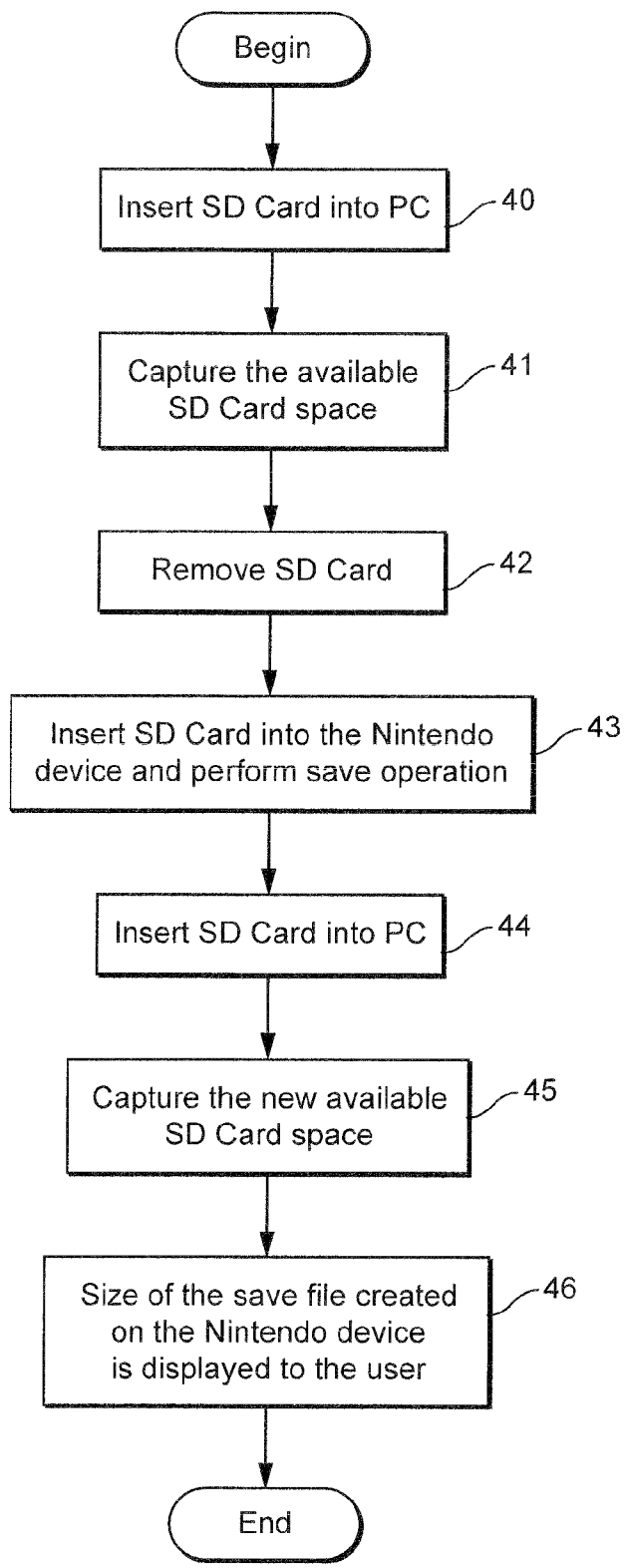
FIG. 4 shows an exemplary illustrative non-limiting software flowchart.

FIG. 4 shows a flowchart of an exemplary illustrative non-limiting process performed by the method for obtaining the size of a file of save data created by a Nintendo device. First, the application obtains an initial state of the SD card. This is accomplished by inserting the SD card into the PC device 18 executing the method (step 40). The application then captures the available SD card space (step 41). Next, the SD card is removed from the PC device (step 42), inserted into the Nintendo device 1 and a save operation is performed (step 43). The user then re-inserts the SD card into the PC 18 (step 44). The application then captures the new available SD card space (e.g., after the save operation was performed by the Nintendo device) in step 45. By comparing the new space available (after the re-insertion) with the previous space available (before insertion to the Nintendo device), the application determines the size of the save data created by the Nintendo device and displays it to the user (step 46).

The exemplary illustrative non-limiting method presented herein allows the user to fill the SD card completely with a very large file. The file is created by obtaining the amount of free space available on the SD card (provided in step 41 of the Check File Size process), and repeatedly writing large segments of data to the SD card until the free space is nearly exhausted. Thereafter, one-byte values are written to the SD card for the remainder of the process until the free space is exhausted. In a testing procedure, the full SD card allows the tester to ensure that games display accurate information to users when only insufficient memory is available on the SD card medium.

In addition, the exemplary illustrative non-limiting method presented herein allows the user to create a file having a user-defined size. This allows users to designate a file size they would like to create. Upon initiating the save process, a file of this size is written to the SD card. This option allows flexibility in case a user knows the size of the file he/she needs to create. Additionally, if procedures change in the future, this ensures that the application can meet unexpected product testing needs.

The method also allows the user to create a file of exact size. More specifically, the method requests a value from the user for the size of save data file that was created by the Nintendo device (obtained in step 46 of the Check File Size process). Using this value, the application will write a file to the SD card that leaves exactly enough free space on the SD card for the save file to fit. When the tester uses the card in the Nintendo device, a save operation should complete successfully. If the save operation does not succeed, this condition on the SD card helps to identify the problem.

Another available option to the user is to create a file of insufficient size. The method requests a value from the user for the size of save data file that was created by the Nintendo device (obtained in step 46 of the Check File Size process). Using this value, the application will write a file to the SD card that leaves less than enough space to perform a save operation on the Nintendo device. For example, the application will create a file on the SD card that is of a size that leaves exactly one SD card block less than it is necessary to save the file. In this option, the amount of free space that is available on the SD card is the largest possible amount of memory that will still be small enough to not accommodate a save operation.

It is noted that the application is prevented from inadvertently writing data to a Network, or a local hard drive as a result of user or program error. Only removable devices are recognized by the application, and an automatic device-recognition process ensures that only appropriate device can be selected for write operations.

Finally, the method allows the user to determine whether the SD card offers fast enough transfer rates to ensure that the game does not falter. Some programming guidelines require that games do not rely upon specific transfer rates on SD cards in order for the game to operate properly. To test this guideline, the tester may use an unusually slow SD card to study the performance of the game under slow transfer rates.

The method establishes benchmark data by writing (and then erasing) a 5 MB file to the SD card 10 times. For each iteration of the write process, statistical information is gathered on the amount of time the write process took. After all write operations are complete, the following information is displayed to the user:

Median transfer rate (MB/sec) AND median write time
Average transfer rate (MB/sec) AND average write time
Fastest transfer rate (MB/sec) AND fastest write time
Slowest transfer rate (MB/sec) AND slowest write time In other words, by having all the above options available, the user/tester may obtain a comprehensive picture of the ability of the SD card to operate with a Nintendo device while the Nintendo device creates data to save in the SD card.

Figure 5:
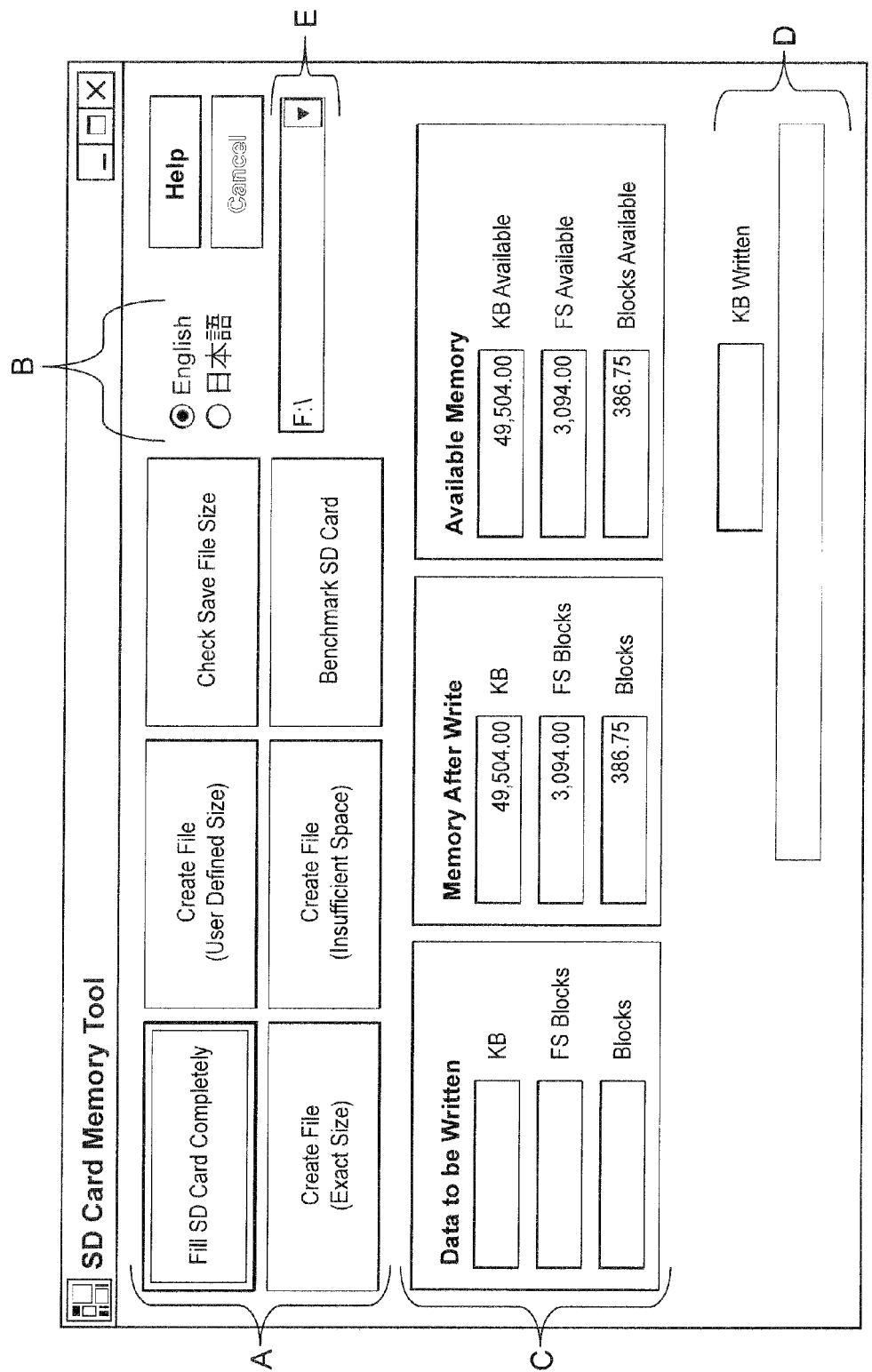
FIG. 5 and FIG. 6 show a screenshot of the main window interface according to a non-limiting exemplary embodiment.

FIG. 5 shows a screenshot of the main window interface of the application. The application interface comprises buttons A to perform various operations (described above); buttons B for switching the language settings of the application between English and another language; panels C containing information about specific data such as 'Data to be written', 'Memory after write', and 'Available Memory'; text boxes within each panel that display numerical memory values; a status area D consisting of a progress bar, a KB written text box, a percent complete label, and a time remaining label; and a drop-down menu E populated by all available removable drives that are connected to the PC.

Figure 6:
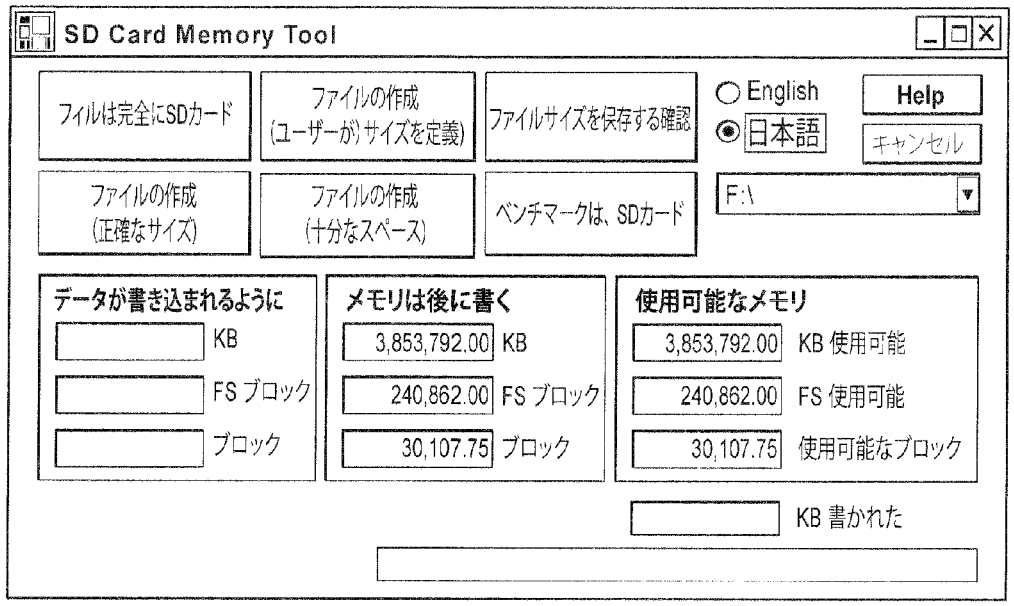

In one exemplary illustrative non-limiting embodiment, the main window has 8 buttons A:
  i. Fill SD Completely
  ii. Create File (User Defined Size)
  iii. Check Save File Size
  iv. Create File (Exact Size)
  v. Create File (Insufficient Space)
  vi. Benchmark SD Card
  vii. Help viii. Cancel There are 2 values available for the language setting button B, English and Japanese (see FIG. 6). When the toggle is switched between English and Japanese, all interface labels and messages are changed to the selected language.

There are three panels C, each containing the following boxes:
  i. Data to be written
    i. KB
    ii. FS Blocks
    iii. Blocks
  ii. Memory After write
    i. KB
    ii. FS Blocks
    iii. Blocks
  iii. Available Memory
    i. KB
    ii. FS Blocks
    iii. Blocks When displaying information to the user regarding data to be written and memory size, the application converts the kilobyte values that apply to the SD card to FS Blocks and Blocks, as they apply to the Wii console. This assists users with understanding the displayed values both in terms of the units that are used in the Wii console for development (FS Blocks) and also in terms of the units that are displayed to the user (Blocks).

The status area D consists of the following elements:
  i. Progress Bar
  ii. KB Written Text Box
  iii. Percent Complete label
  iv. Time Remaining label As a write operation is occurring, this status area is updated to reflect the progress of the operation.

If more than one removable memory device is connected to the PC, the drop down box E serves as an area for the user to input a drive selection. If only one removable device is connected, it is automatically selected by default.

Figure 7:
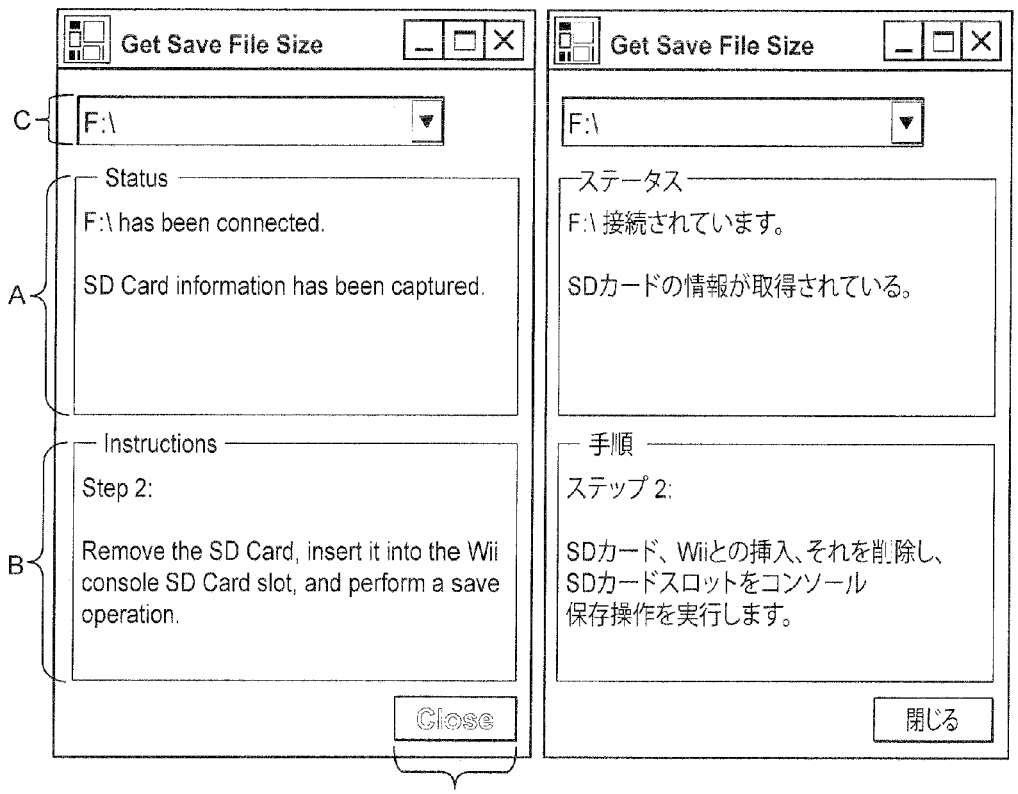
FIG. 7 shows a screenshot of the Check Save File Size interface according to a non-limiting exemplary embodiment.

FIG. 7 shows a screenshot of the Check Save File Size window interface of the application. This window handles the Save File Size process of the application and includes a Status Area A, an Instructions Area B, a Drive Selection drop-down box C and a close button D.

The Status Area A displays text to the user about the status of the check save file size process. The four states that can be displayed are: No device selected; SD card connected/captured; Device disconnected; and Process complete.

The Instructions area B provides instructions to the user how to proceed through the Get Save File Size process. For example, step 2 recites "remove the SD card, insert it into the Wii console SD card slot, and perform a save operation".

The Drive Selection Drop-down box C offers control that allows users to select a drive in the same way they can in the main application window.

After the process has been completed successfully, the Close button D becomes active. Pressing the button when active allows the user to close the Get Save File Size window. Alternatively, the window can be closed at any time by using the 'X' in the upper right corner of the window.

Figure 8:
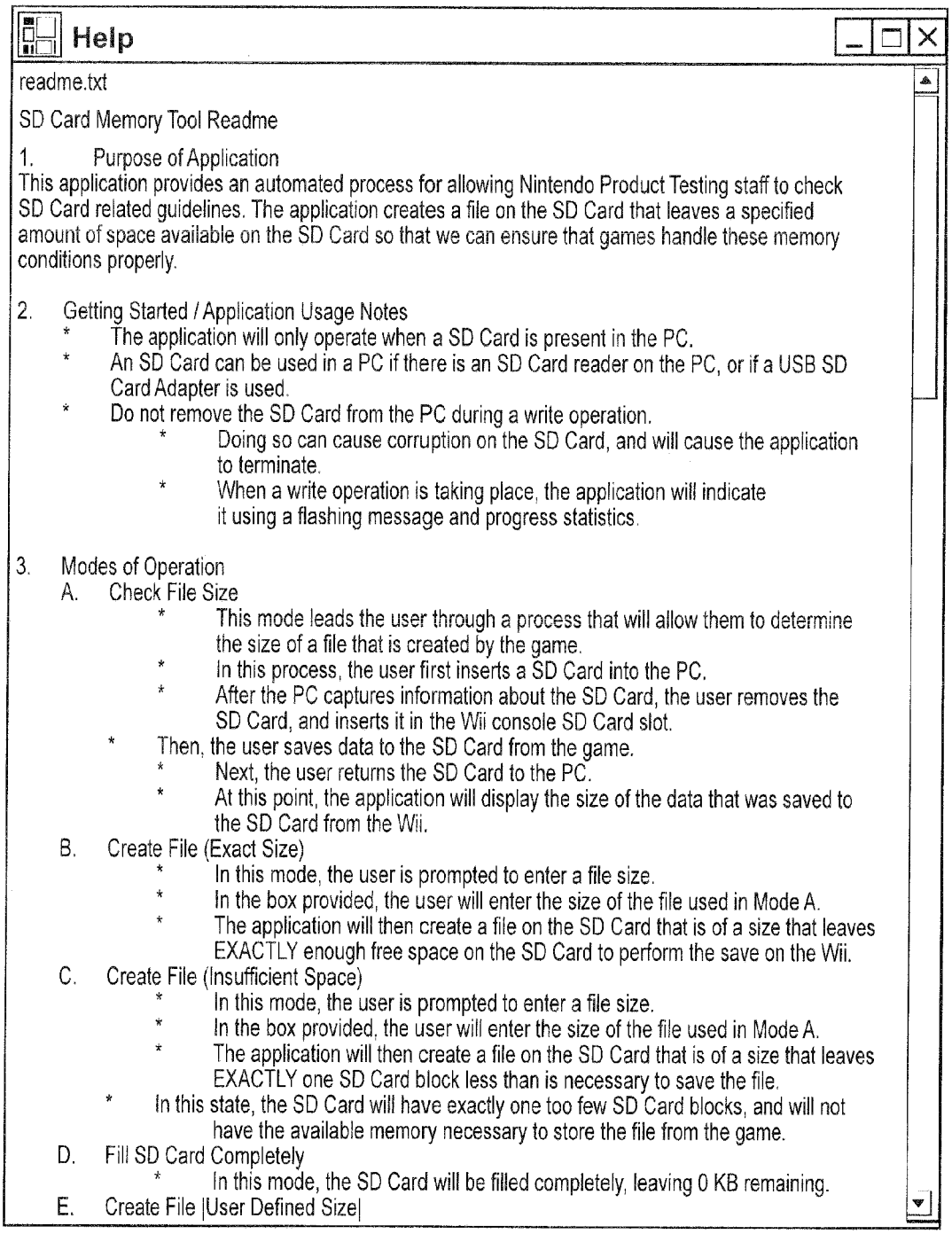
FIG. 8 shows a screenshot of the Help window interface according to a non-limiting exemplary embodiment.

A Help window shown in FIG. 8 comprises a text file that provides the user with some basic information on the general operations of the application.

Depending upon the file system settings at the time of format (e.g., FAT12, FAT 32, etc.), SD cards may have different cluster sizes (contiguous groups of hardware sectors where disk space is allocated). A cluster size is the smallest logical amount of data that can be saved to a storage medium. Due to this architecture feature, a file can take up more space in a storage device than it really takes up in raw data (for example, using a device with 32 KB cluster size, a 33 KB file would require 64 KB, two clusters, for data storage).

On the Wii console, files are created in 16 KB units (FS Blocks). For this reason, there can be cluster size mismatch between the storage medium on the Wii and the SD card medium that is the destination. The disclosed application takes into account the possibility that the cluster sizes are mismatched, and ensures that the files created by the application are accounting for this phenomenon. This calculation method applies equally to any other Nintendo device, regardless of the size of the storage unit.

The method and apparatus disclosed herein offers an automated process for obtaining the file size of a file that is saved on an SD card. Moreover, the automated process allows the creation of various memory conditions for the SD card, so that the software behavior under abnormal memory conditions can be ascertained.

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

We claim:

1. A method for performing a process for detecting the size of a file saved by a computer game device on an SD memory card, the method comprising:

inserting the SD memory card into a computer device;

determining the amount of the available SD memory card memory space and saving the determined amount of the available SD memory card memory space in a memory;

physically removing the SD memory card from the computer device;

inserting the SD memory card into the computer game device and performing a save operation of saving game data created by the computer game device;

physically removing the SD memory card from the computer game device and re-inserting it into the computer device;

determining the amount of the new available SD memory card memory space after the performed save operation of game data created by the computer game device on the SD memory card, and saving the determined amount of the new available SD memory card memory space in the memory;

after determining the amount of the new available SD memory card memory space after the saving of the game data created by the computer game device, comparing the saved determined new available SD memory card memory space after the re-insertion of the SD memory card into the computer device with the saved determined previous available SD memory card memory space before the insertion into the computer game device; and displaying the size of the file of the game data created by the computer game device in said performed save operation to a user.

2. The method according to claim 1, wherein the computer game device is one of Nintendo Wii and Nintendo DS.

3. The method according to claim 1, wherein the computer device is a personal computer device.

4. A computing system for detecting the size of a file saved on a removable non-volatile memory card by a computer device capable of playing games, the computing system comprising:

a computer processor configured to execute instructions stored in memory to perform at least:

determining the amount of an available memory space of the removable non-volatile memory card at a time after the removable non-volatile memory card has been made readable by the computing system and saving the determined amount of the available memory space in the memory;

determining the amount of the new available memory space of the removable non-volatile memory card after the removable non-volatile memory card has again been made readable by the computing system after the computer device capable of playing games has performed a save operation of saving game data created by the computer device capable of playing games on the removable non-volatile memory card, and saving the determined amount of the new available memory space in the memory;

at a time after determining the amount of the new available memory space after the saving of game data created by the computer device capable of playing games, comparing the saved new available memory space with the saved previous available memory space before the save operation performed the computer device capable of playing games; and causing the output of the size of the file of the game data on the removable non-volatile memory card created by the computer device capable of playing games by said performed save operation.

5. The computing system according to claim 4, wherein the computer device capable of playing games is one of a portable handheld device or a non-portable device.

6. The computing system according to claim 4, wherein the computing system is a personal computer device.

7. The computing system according to claim 4, wherein the removable non-volatile memory card is an SD memory card.

* * * * *